United States Patent [19]
Feinsod

[11] Patent Number: 5,769,574
[45] Date of Patent: Jun. 23, 1998

[54] METHOD AND APPARATUS FOR PRECISION BORING OF POCKET-HOLES

[76] Inventor: Stephen S. Feinsod, 17256 Ryton La., Boca Raton, Fla. 33496

[21] Appl. No.: 625,413

[22] Filed: Mar. 29, 1996

[51] Int. Cl.$^6$ .............................. B23B 35/00; B23B 41/00
[52] U.S. Cl. ............................ 408/1 R; 408/103; 408/95; 408/241 S
[58] Field of Search .............................. 408/1 R, 14, 103, 408/95, 88, 225, 224, 234, 241 S, 26

[56] References Cited

U.S. PATENT DOCUMENTS

| | | |
|---|---|---|
| 2,790,259 | 4/1957 | Havens . |
| 3,552,050 | 1/1971 | Marateck . |
| 3,626,513 | 12/1971 | Pylak ................................... 408/103 X |
| 3,673,674 | 7/1972 | Catulle . |
| 3,836,274 | 9/1974 | Heuschen et al. . |
| 4,489,512 | 12/1984 | Schovee . |
| 4,955,766 | 9/1990 | Sommerfeld ......................... 408/103 X |
| 5,059,090 | 10/1991 | Bobroff et al. . |
| 5,149,236 | 9/1992 | Rapayelian . |
| 5,380,119 | 1/1995 | Hadden . |
| 5,553,645 | 9/1996 | Durney .................................. 408/26 X |

FOREIGN PATENT DOCUMENTS

| 611000 | 9/1926 | France ..................................... 408/88 |
|---|---|---|

OTHER PUBLICATIONS

"Save A Step When Drilling Pocket Holes", p. 23. of Leichtung catalog.

*Primary Examiner*—Daniel W. Howell
*Assistant Examiner*—Henry W. H. Tsai
*Attorney, Agent, or Firm*—Kennedy Covington Lobdell & Hickman, LLP

[57] ABSTRACT

A device and method for boring pocket-holes in frame members having a miter joint to prepare them for final assembly. Two frame members are placed on the positioning frame of the invention and clamped against the positioning frame and together at the miter joint with a moveable clamp, which has a clamp member having resilient clamping pads to contact the face surfaces of the picture frame members. The clamp member also includes a guide assembly which causes the clamping pads to apply clamping force to each of the frame members to hold them securely and to urge them together at the miter joint. A drill assembly supports a drill bit and carries the drill bit along a path to drill a pocket-hole having a centerline passing through the frame member on the first surface, passing obliquely across the miter joint and into the frame member on the second surface. The drill carriage repositions the drill bit to bore another pocket-hole which also passes through the frame member on the first surface, obliquely across the miter joint, and into the frame member on the second surface, and the drill carriage can be adjusted to vary the location of the second pocket-hole. The drill bit bores pocket-holes which have a pilot hole portion, a shank hole portion, and a countersink hole portion.

9 Claims, 6 Drawing Sheets

METHOD AND APPARATUS FOR PRECISION BORING OF POCKET-HOLES

BACKGROUND OF THE INVENTION

The present invention relates generally to devices for preparing picture frame members so that they can be easily assembled, and more particularly to a device for precisely boring pocket-holes across the miter joints of picture frame members so that they can later be joined together in precise alignment.

Historically, almost all retail purchases of large, ornate picture frames were made at frame shops located close to the retail customer's home, and the retail customer would travel to the frame shop to order the frame and then later return to pick up the frame after it had been assembled. However, in recent years phone and mail-order purchases of frames have grown significantly, due in part to the economies of scale and favorable pricing which high volume frame manufacturers can employ. As a result, there has recently been a dramatic increase in the manufacturing and sale of large, ornate picture frames to retail customers who purchase the frames by phone or mail.

Frames cannot be economically shipped in assembled form, so they are typically delivered unassembled in a kit, and the retail customer must undertake final assembly of the frame. However, in order for the frame to have a pleasing appearance, the joints of the frame must align with a high degree of precision, particularly with ornate frames, which often have intricate relief detail on the face of the frame, so that even a slight error in alignment can create an unsightly joint. Ornate frames are also relatively costly, and in consequence customers demand that such frames have no visible faults when assembled.

Thus, there is a need for an apparatus and method for preparing frames members so that they are extremely easy to assemble for as wide a group of consumers as possible, yet which produces a frame which has highly accurate alignment of the frame members in finished form. Previous attempts have been made to develop devices for easily connecting frame members, but all known devices suffer from various disadvantages. Marateck U.S. Pat. No. 3,552,050 discloses a kit for assembling frames which includes a coupling element to be installed in a bore extending perpendicularly across the mitered faces of two frame members at a miter joint. The coupling element is installed within the interior of the bore, and does not extend to either of the two ends of the bore. A screw is inserted in each end of the bore to engage each end of the coupling element, and to thereby draw together and secure the two frame members. However, installation of the coupling element is a relatively complex procedure that may be difficult for the frame-buying public, and the bore is located on the sides of the frame members, where it may be visible and unsightly.

Rapayelian U.S. Pat. No. 5,149,236 discloses a device for assembling a mitered frame which involves a monolithic corner insert piece having the form of two joined-together truncated cones with parallel axes. The corner insert is force fitted into two blind bores on the back of the mitered frame members with each bore being on one of the two sides of the mitered joint so that the frame members are held together by the corner insert. The Rapayelian device does not, however, provide for precision joining of the frame members, in that the corner insert does not securely fasten the frame members together so as to prevent movement the axis generally perpendicular to the front face of the frame. Moreover, the force fitting of the corner insert into blind bores may result in some undesirable misalignment of the frame members.

Hadden U.S. Pat. No. 5,380,119 discloses another form of corner insert for use with frame corner construction that is resiliently yieldable, and therefore does not provide a securely fixed connection between the frame members involved. Moreover, the Hadden corner piece requires that a hole and slot be milled in each frame member to be joined.

Conventional practices in wood joinery include the use of pocket holes, in which a bore extends obliquely across a joint and a screw is inserted in the bore and engaged so that the head of the screw is seated below the surface of the wood in a "pocket." However, known devices for drilling pocket holes do not provide for precision alignment and clamping of the wood members to be drilled, nor do they provide for quick and efficient production of drilled frame members. For example, there exists a simple device which functions as a pocket-hole drill guide, but it must be manually placed and aligned on the workpiece for each set of pocket-holes to be drilled, and therefore does not allow for rapid and efficient production. Moreover, the device does not provide for high-precision alignment and accurate repetition of identical boring operations on a succession of frame members.

The present invention provides a device and method for boring holes for assembly of picture frames which avoids or alleviates the aforesaid drawbacks of conventional approaches.

SUMMARY OF THE INVENTION

In accordance with the present invention, a device and method are provided for boring pocket-holes in frame members to be joined at a miter joint in order to prepare them for easy and quick final assembly. The device of the present invention comprises a positioning frame including a first surface against which one of the frame members can be abutted to position it at a first location, and a second surface against which the other frame member can be abutted to position it at a second location, a moveable clamp which engages and securely clamps both frame members to the positioning frame, and a drill bit which is supported by a drill carriage, the drill bit being moved by the drill carriage along a path which causes it to bore a pocket-hole having a centerline passing through the frame member at the first location on the positioning frame, passing obliquely across the miter joint between the frame members, and into the frame member at the second location.

It is advantageous if the drill bit and drill carriage are employed to bore at least two separate pocket-holes passing through the frame member at the first location, obliquely across the miter joint, and into the frame member at the second location. In order to accommodate different sizes of frame members, a further feature of the invention provides an adjusting mechanism for selectively adjusting the drill carriage to vary the distance between the pocket-holes. The drill bit may advantageously have three progressively-larger stepped diameters, so that one boring motion will produce a pocket-hole having a pilot hole portion, a shank hole portion and a countersink hole portion.

In accordance with another aspect of the invention, the moveable clamp has resilient clamping pads which contact the face surfaces of the frame members, thereby preventing blemishing of the face surfaces. The clamp may also advantageously have a guide assembly which moves the clamp so as to apply a clamping force to each of the frame members along an axis generally perpendicular to the first and second surfaces of the positioning frame, and also along an axis generally parallel to the longitudinal axis of each of the frame members so that the frame members are urged together at the miter joint.

The method of the present invention comprises positioning two picture frame members on a positioning frame, one frame member being abutted against a first surface to position it at a first location, and the other frame member being abutted against a second surface to position it at a second location, moving a clamp member into engagement with the frame members to hold them together at the miter joint, and moving a drill bit along a predetermined path of motion relative to the positioning frame to cause the drill bit to bore a pocket-hole along a centerline extending through the frame member in the first location, obliquely across the miter joint, and into the frame member at the second location. It is advantageous if the clamp member of the method of the present invention is moved into engagement with the frame members with a direction of movement that urges the frame members into contact with one another at the miter joint, and the clamp member is provided with a resilient surface portion for engaging the frame members.

Accordingly, the present invention provides a device and method for boring holes in frame members to prepare them for highly accurate, attractive and easy final assembly. Moreover, the invention allows for efficient and rapid production of bored frame members ready for final assembly.

DETAILED DESCRIPTION OF THE PREFERRED EMBODIMENT

Figure 1:
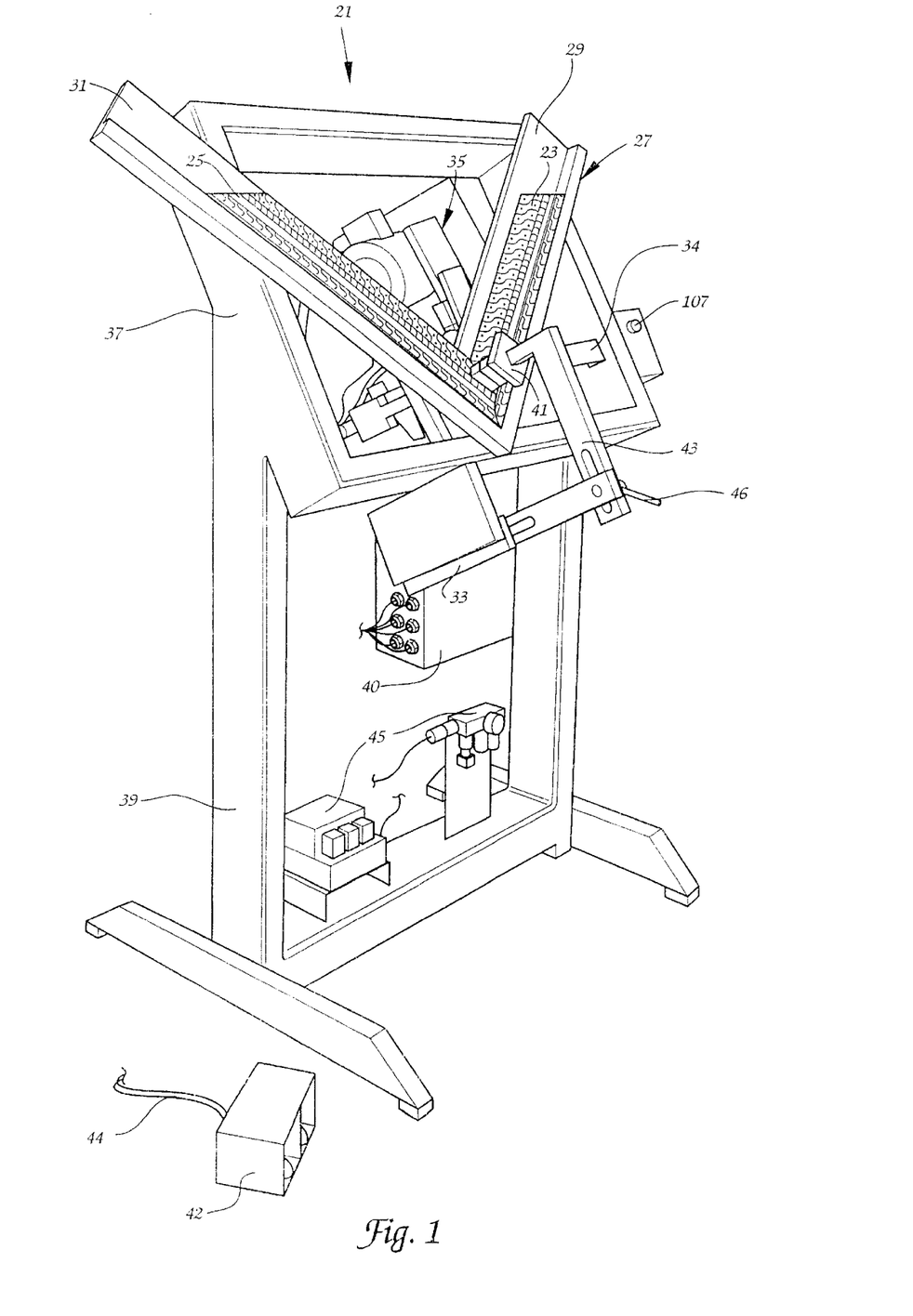
FIG. 1 is a perspective view of a picture frame member boring device embodying the present invention.

Looking now in greater detail at the accompanying drawings, FIG. 1 illustrates in perspective view the precision frame member boring device 21 of the present invention ready for operation. The device prepares picture frame members, such as frame members 23, 25, for assembly and joining at miter joints by frame purchasers who are not necessarily mechanically skilled, and allows such purchasers to produce assembled picture frames with strong and attractive joints. In FIG. 1, picture frame member 23 is aligned on first surface 29 of positioning frame 27, and picture frame member 25 is aligned on second surface 31 of positioning frame 27, in preparation for operation of boring device 21 to bore pocket-holes in picture frame members 23, 25. Positioning frame 27, a clamp drive 33, drill guard 34, and a drill carriage 35 (seen more clearly in FIGS. 2 and 3) are mounted on support frame 37, which is itself mounted on support base 39. Control panel 40 is also mounted on support base 39.

Clamp member 41, which is mounted on clamp support arm 43 and which will be explained in greater detail below, is shown generally in FIG. 1 in its non-engaged position. Clamp drive 33, which is preferably powered by compressed air, moves clamp support arm 43 through a range of motions to engage clamp member 41 with picture frame members 23, 25 in clamping contact. The position of clamp arm 43 can be adjusted by loosening and tightening lever 46. Foot switch 42 operates clamp drive 33 through electrical line 44, partially shown in FIG. 1, and controls compressed air equipment 45 to cause clamp drive 33 to move clamp member 41 into and out of clamping contact with picture frame members 23, 25.

Figure 2:
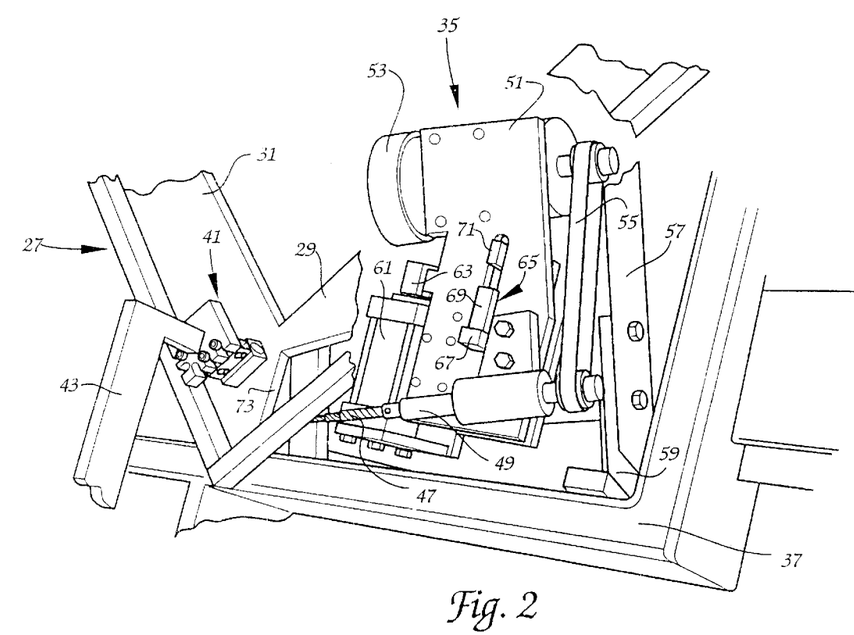
FIG. 2 is a partial perspective view of the device of FIG. 1, with a portion of the positioning frame broken away to show the drill carriage of the device.
Figure 3:
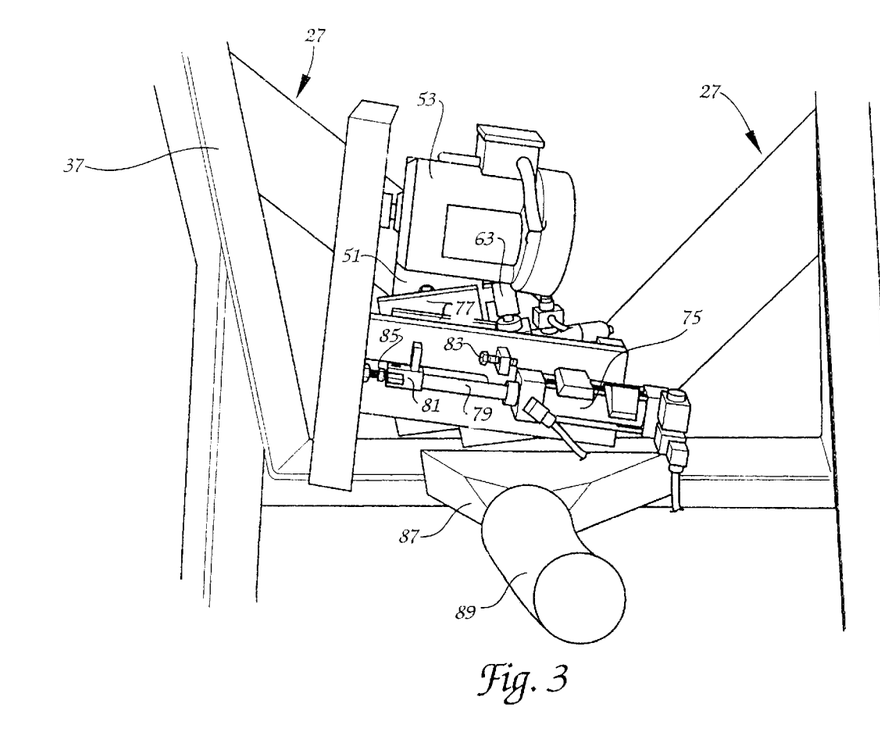
FIG. 3 is a partial perspective view of the back of the device of FIG. 1 showing further details of the drill carriage.

FIG. 2 shows a portion of the boring device of the present invention with positioning frame 27 partially cut away, so that drill carriage 35 and its components are visible. Drill bit 47 is mounted in drill collet 49, which is in turn mounted on carriage plate 51 and driven by electric motor 53 via drive belt 55, and electric motor 53 is also mounted on carriage plate 51. Belt guard 57, which protects the operator of the device from accidental contact with drive belt 55, is mounted on support member 59.

Carriage plate 51 is moved between a lower position and an upper position by vertical drive cylinder 61, which is preferably operated by compressed air, and which is connected to carriage plate 51 by coupling 63. Movement of carriage plate 51 between its lower and upper positions allows drill bit 47 to bore two pocket-holes in the picture frame members 23, 25 aligned on positioning frame, as will be explained in greater detail presently. In FIG. 2, carriage plate 51 is shown in its lower position. The range of generally vertical motion of carriage plate 51 is controlled and limited by adjusting assembly 65, which consists of lower stop 67, interchangeable spacer cylinder 69, and upper stop 71. The range of generally vertical motion of carriage plate 51 can be adjusted by replacing spacer cylinder 69 with a spacer of a different length. The generally vertical motion of carriage plate 51 controls the distance between the centerlines of the pocket-holes bored in the upper and lower positions of carriage plate 51.

An opening 73 formed in first surface 29 allows drill bit 47 to move through the plane of first surface 29 of positioning frame 27 so as to contact picture frame members 23, 25 to bore pocket-holes in them. The generally horizontal boring motion of drill bit 47 is produced by horizontal drive cylinder 75 (shown in FIG. 3), which is preferably operated by compressed air, and which is connected to horizontal slide plates 77 by drive rod 79 and coupling 81. Horizontal slide plates 77 support vertical drive cylinder 61, and thereby also support carriage plate 51 and the components attached to carriage plate 51, including electric motor 53, drill collet 49, and drill bit 47. Horizontal drive cylinder 75 moves horizontal slide plates 77 along a generally horizontal path of motion, and drill bit 47, which is supported by carriage plate 51 and horizontal slide plates 77, is also thereby moved in a generally horizontal path. The travel of horizontal slide plates 77, and thus the travel of drill bit 47, is limited by depth stop 83 and travel stop 85. Depth stop 83 and travel stop 85 can be adjusted to provide for a different distance of travel for horizontal slide plates 77 and drill bit 47, which results in a different depth for the pocketholes bored by the drill bit 47.

The sequence of the movements of carriage plate 51 and horizontal slide plates 77 is regulated by control panel 40 and a conventional control system including limit switches (not shown) to detect the travel of carriage plate 51 and horizontal slide plates 77. The details of the conventional control system form no part of the present invention. The boring of pocket holes in wood-product work pieces inherently produces sawdust, and this sawdust is controlled by being drawn into sawdust nozzle 87 and exhaust conduit 89 by a conventional sawdust collection system (not shown) to remove the sawdust from precision boring device 21.

Figure 9:
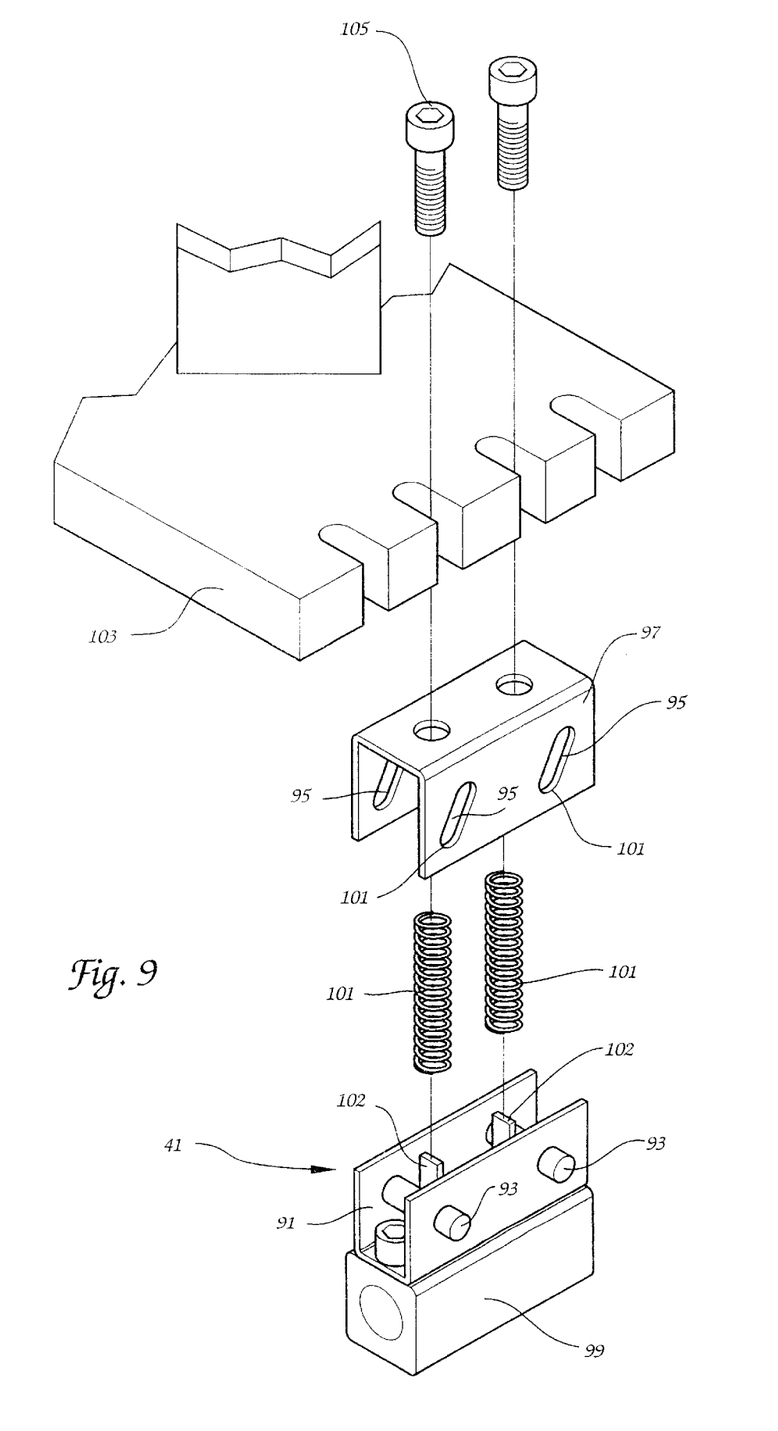
FIG. 9 is an exploded isometric view of a portion of the clamping member of the device of the present invention.

The clamp member 41, as shown in FIG. 9, includes a two-piece guide assembly comprising a fixed bracket 97 attached to a support plate 103 by bolts 105 that threadedly engage and extend into fixed bracket 97, and a moveable bracket 91 having guide posts 93 slidably mounted in diagonally extending slots 95 formed in fixed bracket 97 to permit movement of moveable bracket 91 relative to fixed bracket 97. A pair of coil springs 101 are supported at one of their ends by the ends of bolts 105 (not shown) and at the other end by mounting posts 102 in moveable bracket 91 to normally resiliently urge moveable bracket 91 away from fixed bracket 97. Moveable bracket 91 also has a resilient pad 99, preferably formed of vinyl rubber, fixed to the bottom surface thereof to present a resilient surface for engaging the frame members 23, 25.

Figure 7:
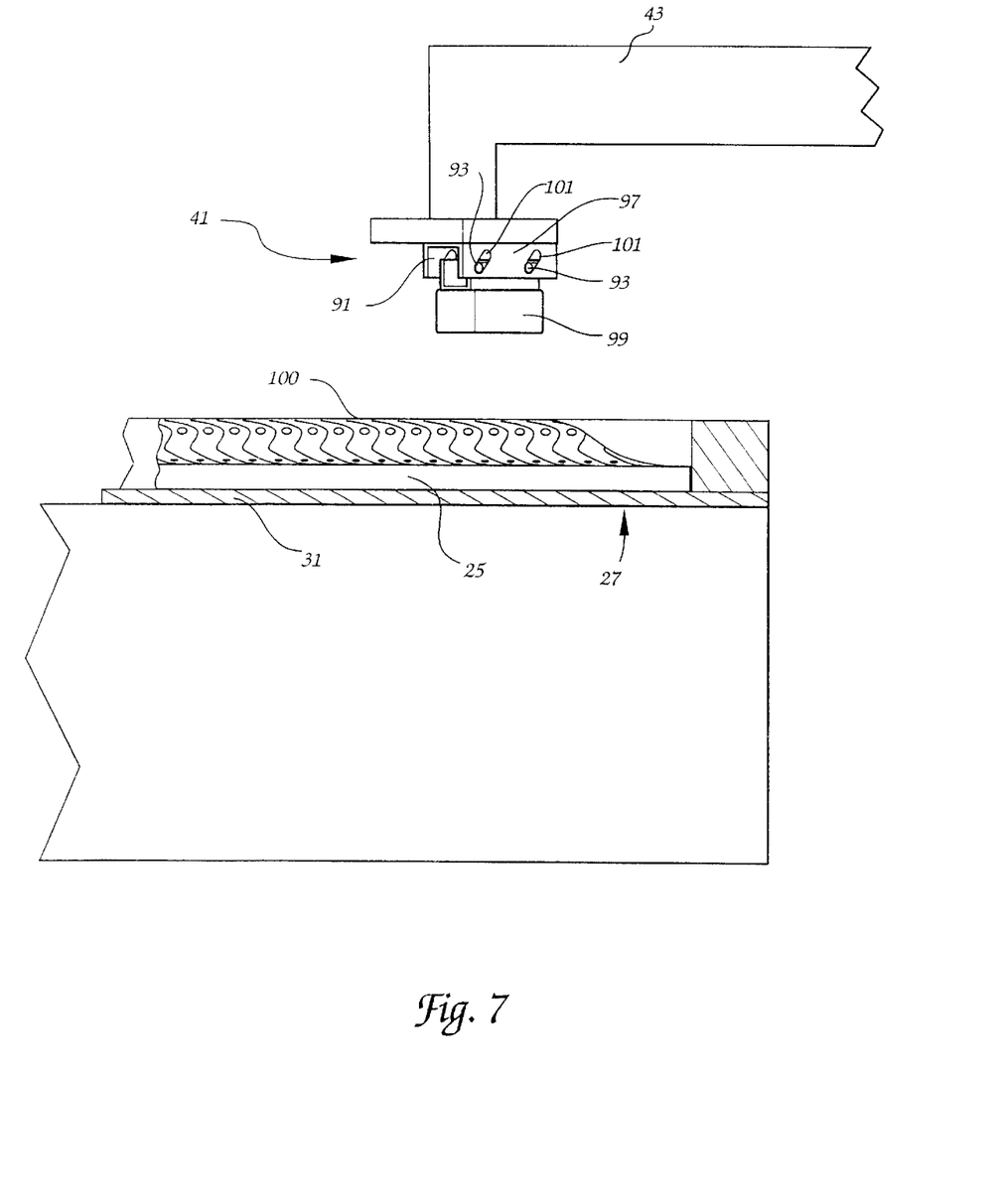
FIGS. 7 and 8 are detailed views showing the progressive movement of the clamping member of the device as it clamps a picture frame member on the positioning frame of the device.
Figure 8:
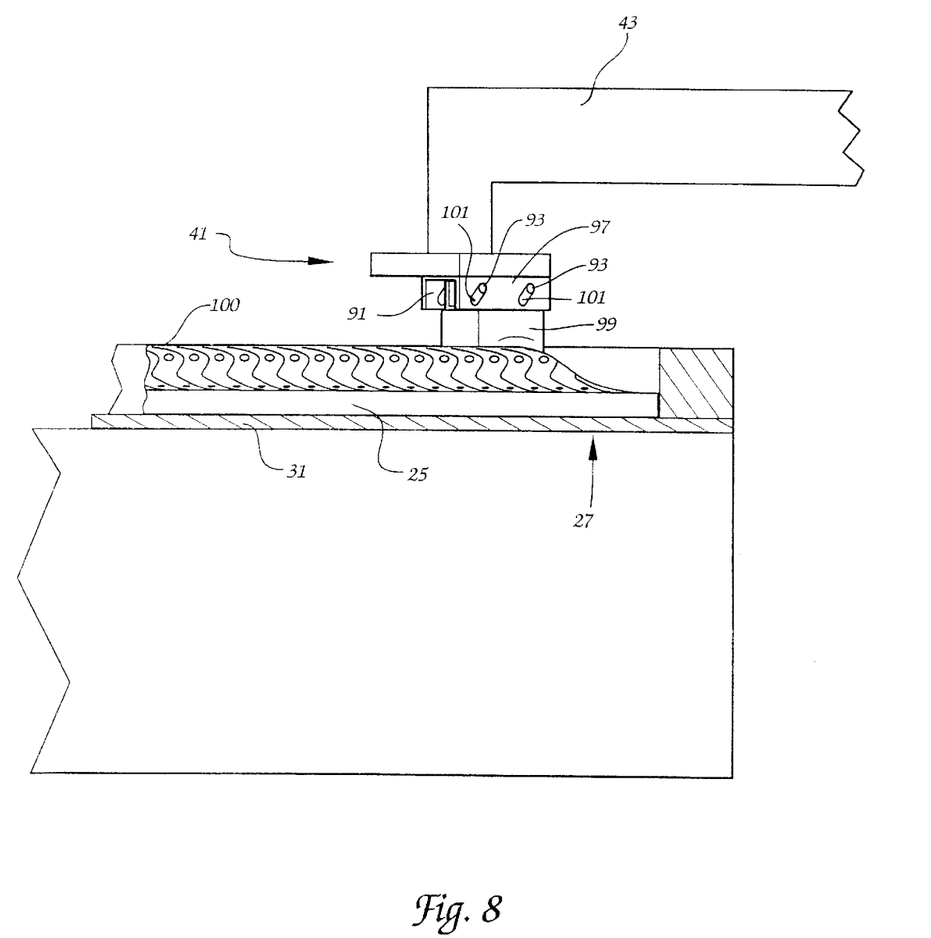

When resilient clamping pad 99 engages picture frame member 25, as shown in the sequence of FIGS. 7 and 8, guide posts 93 travel along guide slots 95 which act to move clamping pad 99 along a path oblique to the plane of first surface 29 and second surface 31 of positioning frame 27. The oblique path of clamping pad 99 thereby imparts clamping forces to picture frame member 23, 25 both along an axis generally perpendicular to first surface 29 and second surface 31, as well as along an axis generally parallel to the longitudinal axis of picture frame members 23, 25 to urge frame members 23, 25 tightly together at the miter joint and hold them firmly in place for boring of pocketholes.

Resilient clamping pad 99 deflects somewhat as it engages face surface 100 of picture frame member 25, as shown in FIG. 8, and this resiliency, combined with the additional resiliency provided by springs 101, allows clamping pad 99 to firmly engage and hold picture frame members having irregular and ornate face surfaces, while also preventing damage to the relief detail often found on such ornate picture frames. Although only one resilient clamping pad 99 is shown in FIGS. 7 and 8 above picture frame member 25 and in FIG. 9, it will be understood that there is a second identical resilient clamping pad 99 located above picture frame member 23 (not shown).

In operation, picture frame members 23, 25 which are to be bored with pocket-holes are aligned on positioning frame 27 as shown in FIG. 1 in preparation for operation of precision boring device 21. Foot switch 42 is actuated to engage clamp drive 33, which moves clamp support arm 43 to bring resilient clamping pads 99 of clamp member 41 into clamping engagement with the face surfaces 100 of picture frame members 23, 25, which are thereby securely clamped on positioning frame 27 and pushed together tightly by the camming action of guide slots 95 on guide posts 93 of resilient clamping pads 99.

Switch 107 is then actuated to begin the precision boring of picture frame members 23, 25. Horizontal slide plates 77 are moved along a generally horizontal path by horizontal drive cylinder 75 so as to move carriage plate 51 in a generally horizontal path, along with the components attached to carriage plate 51, including electric motor 53, drill collet 49, and drill bit 47. Drill bit 47 thus extends through opening 73 to first contact and bore picture frame member 23, and then picture frame member 25. Once horizontal slide plates 77 move a distance sufficient to bring coupling 81 in contact with depth stop 83, at which point drill bit 47 reaches the maximum depth of its boring motion, the aforesaid conventional control system causes the movement of drive rod 79 in horizontal drive cylinder 75 to be reversed in direction, and horizontal slide plates 77 are moved so as to withdraw drill bit 47 from the pocket-hole just bored in picture frame members 23, 25.

Vertical drive cylinder 61 then operates to move carriage plate 51 generally upward to bring drill bit 47 in position to drill a second pocket hole in picture frame members 23, 25. The generally upward movement of carriage plate 51 is limited by adjusting assembly 65 consisting of lower stop 67, interchangeable spacer cylinder 69, and upper stop 71. As discussed above, spacer cylinder 69 can be replaced with a different-sized spacer to alter the distance between the two pocket-holes bored by drill 47, which may be appropriate when frame members of different sizes are to have pocket-holes bored in them by boring device 21.

Once carriage plate 51 has reached its upper position, horizontal drive cylinder 75 once again operates to move horizontal slide plates 77, and thereby drill bit 47, along a generally horizontal path to bore another pocket hole in picture frame members 23, 25. When the maximum depth of the pocket hole is reached and coupling 81 engages depth stop 83, the conventional control system causes the direction of movement of drive rod 79 in horizontal drive cylinder 75 to be reversed, which returns horizontal slide plates 77, and thereby drill bit 47, to a position in which coupling 81 engages travel stop 85, and drill bit 47 is withdrawn from the pocket-hole just bored.

Figure 4:
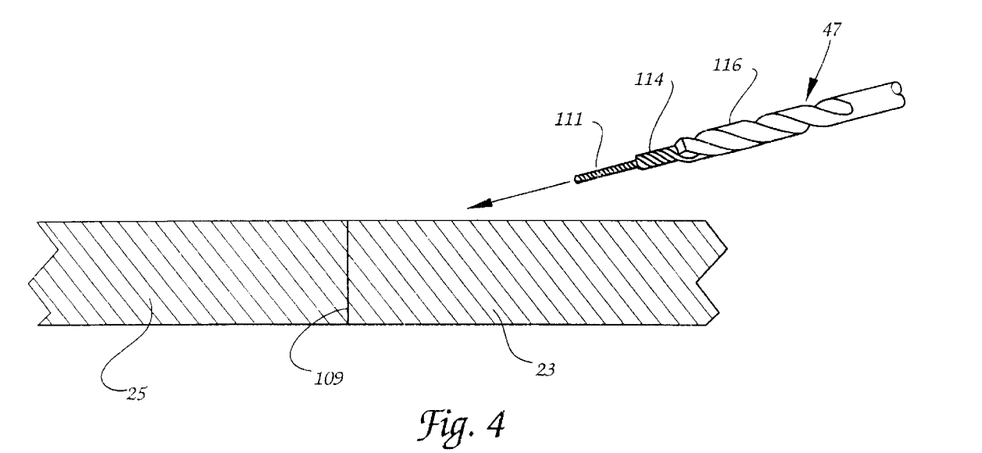
FIGS. 4 and 5 are diagrammatic views of two picture frame members and the drill bit of the present invention showing the progressive movement of the drill bit as it bores a pocket-hole in the picture frame members.
Figure 5:
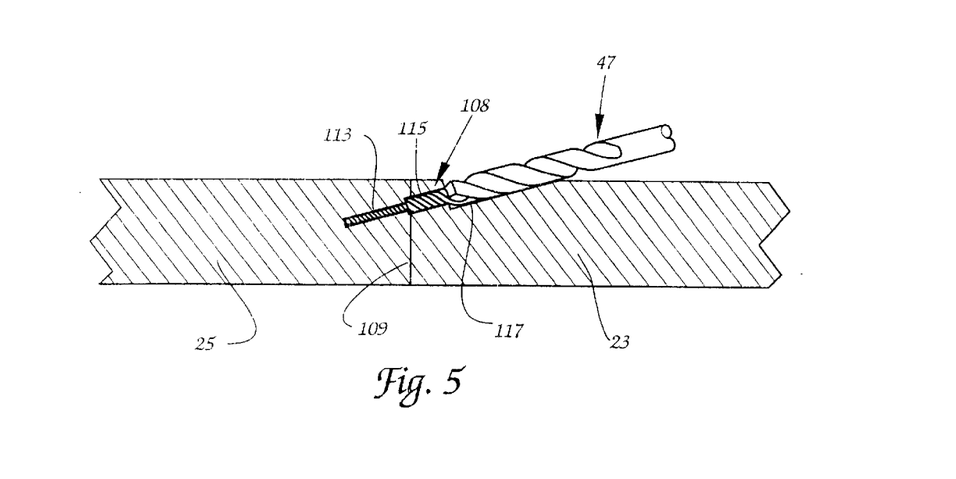

FIGS. 4 and 5 illustrate in detail the motion of drill bit 47 as it bores a pocket hole 108 across miter joint 109. Drill bit 47 includes three boring diameters which increase in succession in the direction extending away from the tip of bit 47. The smallest diameter 111 of bit 47 bores pilot hole portion 113 of pocket-hole 108; the intermediate diameter 114 of bit 47 bores shank hole portion 115 of pocket-hole 108; and the largest diameter 116 of bit 47 bores countersink hole portion 117 of pocket-hole 108.

Figure 6:
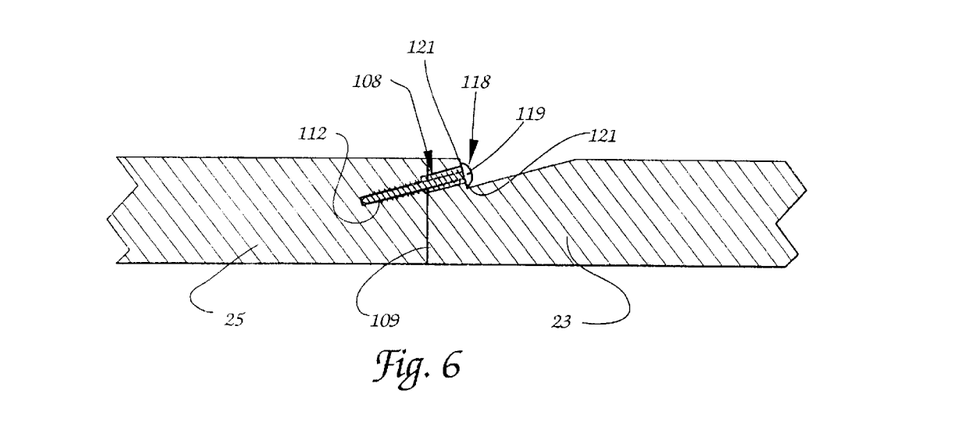
FIG. 6 is a diagrammatic view similar to FIG. 5 showing an assembled picture frame joint with a screw threaded into a pocket-hole bored by the device of the present invention.

FIG. 6 shows a miter joint 109 assembled with screw 118 threaded in a pocket-hole 108 of the type produced by the present invention. Screw threads 112 are engaged in pilot hole portion 113 of pocket-hole 108, while screw head 119 is seated on shoulders 121 created by the meeting of shank hole portion 115 and countersink hole portion 117. Screw threads 112 are therefore engaged in frame member 25, while screw head 119 is seated in frame member 23, and threading of screw 118 in pockethole 108 puts screw 118 in tension and draws frame member 23, 25 tightly together to create a strong and tight connection at miter joint 109. Once all four picture frame members of a particular picture frame have been bored with pocket holes by the device of the present invention, the picture frame can be assembled by gluing the miter joints and threading assembly screws in the pocket holes, as shown in FIG. 6.

The precision boring device and method of the present invention has several advantages over previous devices. Picture frame members can be quickly and precisely aligned on positioning frame for boring, and clamp member 41 firmly secures picture frame members 23, 25 in appropriate positions for precision boring. The camming action of guide slots 95 on guide posts 93, and resilient clamping pads 91 and springs 101, push frame members 23, 25 tightly together so that the pocket-holes bored by the present invention allow the frame members to be tightly joined with a minimal gap, thereby resulting in a joint with a highly attractive appearance. Resilient clamping pads 99 engage frame members so that ornate and delicate relief on the face surfaces of the frame members is not blemished, but the frame members are nonetheless securely clamped in place.

Assembly of frames bored with pocket-holes by the device and method of the present invention is easy, quick, and simple. Purchasers are thus able to assemble picture frames at home, and to thereby produce picture frames with high quality, precise joints, and even frames with ornate relief can be joined without visible faults. The resulting connections between the picture frame members are also strong and tightly joined by virtue of the screws being positioned in pilot hole portion 113, shank hole portion 115, and countersink hole portion 117 in the pocket-hole produced by drill bit 47.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. Apparatus for precision boring of two frame members to be joined at a miter joint, comprising:

a positioning frame for accurately positioning said frame members at said miter joint, including a first surface against which one of said frame members can be abutted to position it at a first location, and a second surface against which the other of said frame members can be abutted to position it at a second location;

clamping means for accurately and securely clamping said frame members together at said miter joint, including a moveable clamp member for engaging and clamping said frame members on said positioning frame;

boring means for boring at least one pocket-hole in said frame members; and carriage means supporting said boring means for movement along a predetermined path of motion relative to said positioning frame, said path of motion causing said boring means to form said pocket-hole along a centerline extending through said frame member in said first location, obliquely across said miter joint, and into said frame member at said second location.

2. The precision boring apparatus of claim 1, in which said boring means bores at least two pocket-holes in said frame members and said carriage means locates said boring means for boring said at least two pocket-holes.

3. The precision boring apparatus of claim 2, in which said carriage means includes adjusting means for selectively adjusting said carriage means to vary the distance between said at least two pocket-holes formed by said boring means.

4. The precision boring apparatus of claim 1, in which said boring means includes a drill bit having three progressively-larger stepped diameters for boring a pilot hole portion, a shank hole portion, and a countersink hole portion of said pocket-hole in one boring motion.

5. The precision boring apparatus of claim 1, in which each of said frame members has a face surface and said clamp member includes a resilient clamping pad for contacting said face surfaces, whereby blemishing of said face surfaces is prevented.

6. The precision boring apparatus of claim 1, in which said clamping means includes guide means for moving said clamp member in a predetermined direction of movement that applies a clamping force to each of said frame members along an axis generally perpendicular to said first surface and said second surface of said positioning frame, and along an axis generally parallel to the longitudinal axis of each of said frame members to urge said frame members together at said miter joint.

7. Apparatus for precision boring of two frame members to be joined at a miter joint, comprising:

a positioning frame for accurately positioning said frame members at said miter joint, including a first surface against which one of said frame members can be abutted to position it at a first location, and a second surface against which the other of said frame members can be abutted to position it at a second location;

clamping means for accurately and securely clamping said frame members together at said miter joint, including a moveable clamp member for engaging and clamping said frame members on said positioning frame, said clamp member having a resilient clamping pad for contacting said frame members, whereby blemishing of said frame members is prevented, and a guide means for moving said resilient clamping pad in a predetermined direction of movement that applies a clamping force to each of said frame members along an axis generally perpendicular to said first surface and said second surface of said positioning frame, and along an axis generally parallel to the longitudinal axis of each of said frame members to urge said frame members together at said miter joint;

boring means for boring at least two pocket-holes in said frame members, said boring means including a drill bit having three progressively-larger stepped diameters for boring a pilot hole portion, a shank hole portion, and a countersink hole portion of said pocket-hole in one boring motion; and carriage means supporting said boring means for movement along a predetermined path of motion relative to said positioning frame, said path of motion causing said boring means to form each of said at least two pocket-holes along separate center lines extending through said frame member in said first location, obliquely across said miter joint, and into said frame member at said second location, said carriage means including an adjusting assembly for selectively adjusting said carriage means to vary the distance between said at least two pocket-holes.

8. A method for precision boring of two frame members to be joined at a miter joint, comprising the steps of:

positioning said frame members on a positioning frame accurately at said miter joint by abutting one of said frame members against a first surface on said positioning frame to position said one of said frame members at a first position, and abutting the other of said frame members against a second surface on said positioning frame to position said other of said frame members at a second location;

moving a clamp member into engagement with said frame members to hold them together at said miter joint; and moving a boring means along a predetermined path of motion relative to said positioning frame to cause said boring means to form a pocket-hole, said path of motion causing said boring means to form said pocket-hole along a centerline extending through said frame member in said first location, obliquely across said miter joint, and into said frame member at said second location.

9. A method as defined in claim 8 wherein said clamp member is provided with a resilient surface portion for engaging said frame members, and wherein said clamp member is moved into engagement with said frame members with a direction of movement that urges said frame members into contact with one another at said miter joint.

* * * * *